United States Patent [19]

Hoshi et al.

[11] Patent Number: 4,569,950
[45] Date of Patent: Feb. 11, 1986

[54] FOAM AND PROCESS FOR PRODUCING SAME

[75] Inventors: Kouroku Hoshi; Shoji Noro, both of Suzuka, Japan

[73] Assignee: Asahi Kasei Kogyo Kabushiki Kaisha, Osaka, Japan

[21] Appl. No.: 721,706

[22] Filed: Apr. 10, 1985

Related U.S. Application Data

[63] Continuation-in-part of Ser. No. 498,654, May 27, 1983, abandoned.

[30] Foreign Application Priority Data

May 31, 1982 [JP] Japan .................................. 57-92369

[51] Int. Cl.$^4$ ............................................... C08J 9/00
[52] U.S. Cl. ......................................... 521/88; 264/54; 521/79; 521/81; 521/94; 521/143
[58] Field of Search ................. 521/88, 94, 134, 79, 521/143, 81

[56] References Cited

U.S. PATENT DOCUMENTS

| | | |
|---|---|---|
| 2,956,960 | 10/1960 | Nemphos ............................. 521/79 |
| 3,102,865 | 9/1963 | Sneary et al. . | |
| 4,214,054 | 7/1980 | Watanabe et al. .................... 521/79 |
| 4,275,168 | 7/1979 | Watanabe . | |
| 4,343,913 | 8/1982 | Watanabe et al. .................... 521/79 |

FOREIGN PATENT DOCUMENTS 36560 3/1981 European Pat. Off. .
36562 3/1981 European Pat. Off. .

*Primary Examiner*—Morton Foelak
*Attorney, Agent, or Firm*—Birch, Stewart, Kolasch & Birch

[57] ABSTRACT

A novel foam composed of closed cells having a specific tensile strength of 150 kg/cm$^2$ or more, a compression recovery of 80% or more and a heat shrinkage of 50% or less, a variation in thickness of foam of less than 50%, a corrugation value of less than 100% and a surface smoothness of less than 2 mm, an average cell diameter of 0.05–3 mm, said foam having a foam density of 0.007–0.10 g/cm$^3$, a variation in thickness of cell wall film of ±30% or less and a variation factor of cell diameter of 70% or less, obtained by foaming a composition consisting essentially of 100 parts by weight of a substantially non-crosslinked polyethylene having a density of 0.935 g/cm$^3$ or more and a melting point of 117° C. or more, 0.05–10 parts by weight of a foaming decelerant having the capability of prolonging the foaming time by at least one second as compared with the absence of the foaming decelerant, as measured by a glass tube blowing test method, and 0.001–5 parts by weight of a nucleating agent. The resulting foam has excellent mechanical properties and heat-resistance and has a good appearance.

8 Claims, 4 Drawing Figures

F I G. 3a
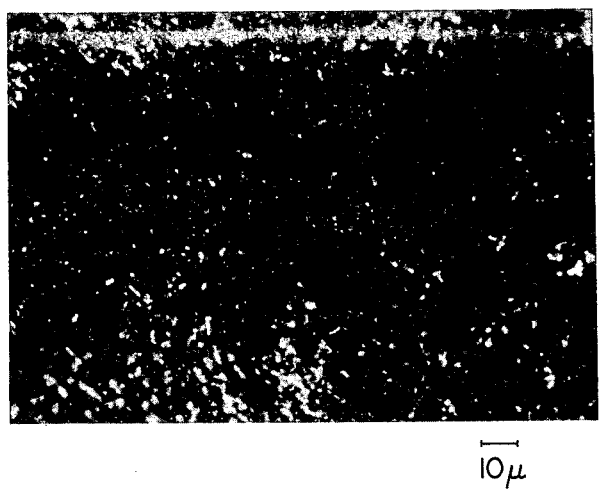
10μ
F I G. 3b
10μ

FOAM AND PROCESS FOR PRODUCING SAME

CROSS-REFERENCES TO RELATED APPLICATIONS

This application is continuation-in-part of application Ser. No. 498,654 filed on May 27, 1983, now abandoned.

BACKGROUND OF THE INVENTION

Field of the Invention

The present invention relates to a novel foam excellent in mechanical properties and heat-resistance and having a good appearance. More particularly, the invention relates to a high-performance foam having a uniform and closed cell structure and a smooth appearance, provided with mechanical characteristics and heat resistance which have never been obtained and having a high reliability for a long period of time, the foam being composed of a substantially non-crosslinked polyethylene having a density of 0.935 g/cm$^3$ or more and a melting point of 117° C. or more.

DESCRIPTION OF THE PRIOR ART

Hitherto, various foams have been proposed and put into market, which include foams of soft and rigid polyurethanes, foams of crosslinked and non-crosslinked low-density polyethylene resins, foams of polypropylene resin, foams of a high-density polyethylene resin-ionomer resin mixture, and the like. However, none of them are satisfactory because they are not simultaneously endowed with both mechanical characteristics and heat-resistance.

For example, the above-mentioned foams of flexible and rigid polyurethanes have inferior mechanical characteristics despite their excellent heat-resistance. Foams of crosslinked low-density polyethylene are inferior in both mechanical characteristics and heat-resistance, and foams of non-crosslinked low-density polyethylene resin are inferior in heat-resistance to the foams of crosslinked low-density polyethylene resin. Foams of polypropylene resin are inferior in mechanical characteristics despite having excellent heat-resistance. Foams of a high-density polyethylene resin-ionomer resin mixture are inferior in heat-resistance despite having excellent mechanical characteristics.

It has heretofore been proposed to modify the foams of high-density polyethylene by blending it with an ionomer, polystyrene, low-density polyethylene, partially crosslinked rubber or the like (U.S. Pat. Nos. 4,102,829 and 4,226,946; Japanese Patent Publication Nos. 16,184/81 and 40,166/81; Japanese Patent Application Kokai (Laid-Open) Nos. 33,569/79 and 161,671/79). However, the desired effect can be achieved only by blending such a resin in a large quantity, which unavoidably results in a decrease of heat-resistance.

Further, there is also known a process for producing a foam of a high-density polyethylene having a good quality by the so-called flash extrusion process which comprises extruding a super-heated solution of a polymer in an activating liquid, which solution has been sealed in a pressure vessel at a high pressure, into a low pressure zone under the specified concentration and temperature conditions in a period of time as short as $10^{-2}$ second or less to flash-evaporate the activating liquid, thereby forming a foam consisting of many cells and simultaneously rapidly cooling the foam to fix the cell structure (U.S. Pat. No. 3,227,784). However, in order to form a uniform foam by such rapid expansion and cooling, the velocity of extrusion must be very high. Further, since the expansion is carried out under very narrow tolerance conditions, wrinkles and irregularities are apt to appear on the surface of the foam, due to which a product having a good appearance cannot be obtained. Further, such a process is not suitable for the production of a foam sheet having a thickness of 3 mm or more.

Further, as an improvement of the flash-extrusion process, there is also known a process wherein the cell diameter is adjusted to 500μ or more for the purpose of increasing the tear strength (U.S. Pat. No. 3,787,543).

In this process, however, the number of bubbles generated at the time of extrusion must be restricted in order to form large-sized cells. Accordingly, existence of not only conventional nucleating agents but also substances causing an increase in the number of bubbles such as accidentally incorporated dust, gel particle, etc., must be avoided as much as possible. Nevertheless, such a nucleating agent must be used because, in its absence, uniform cell diameter and uniform thickness of cell wall cannot be realized, and therefore, unavoidably, the compression recovery is decreased and wrinkle and irregularities occur on the surface of the foam. Furthermore, no foam having a thickness greater than 3 mm can be obtained.

Further, there has also been proposed a process which comprises adding 1,2-dichlorotetrafluoroethane as a foaming agent to molten polyethylene under pressure, introducing the resulting mixture into a pressure vessel while retaining the high pressure and then rapidly extruding it into the atmosphere to expand and foam the same (U.S. Pat. No. 3,067,147). However, if a high-density polyethylene is used in this process, a foam excellent in mechanical strength and surface state is difficult to obtain because a resin having a low melt-viscoelasticity is forcibly foamed.

Apart from the above, there has also been proposed a process for forming a good foam of a high-density, high-crystalline polyethlene by adding a heat sink, such as a $C_2$–$C_5$ alkanol, to the molten polyethylene together with a foaming agent in order that the solidification of polyethylene does not follow the generation of expanding gas and the loss of expanding gas is consequently prevented, thereby forming a good foam (U.S. Pat. No. 3,102,865). This process, however, requires a rapid foaming and a rapid cooling as essential conditions, and hence it is difficult to obtain a foam having an excellent mechanical strength and good surface state by this process, as in the preceding process.

On the other hand, there has also been proposed a process for producing a rigid foam having a high compression strength by extruding a molten polyethylene resin, having dissolved therein a volatile foaming agent, into the atmosphere through a die and slowly cooling the extruded resin so as to allow the average cell diameter to grow up to 5 mm or more (U.S. Pat. No. 3,863,000). The foam produced by this process, however, is insufficient in almost all properties such as cushioning properties, compression recovery, heat-insulating property, and so on, so that it cannot be said to be satisfactory in practice.

As mentioned above, a high-density polyethylene having a high melting point and a high crystallinity shows a greater viscoelastic change in the neighborhood of the melting point, which is suitable for foaming, than a low density polyethylene, and hence, its optimum foaming temperature range is remarkably narrow. Furthermore, the heat generation due to crystallization at the time of foaming and other factors affect one another in a complicated manner. Thus, the optimum foaming conditions are difficult to maintain, and roughening of the surface of foam or break of bubbles can readily take place, which results in a reduction in product quality. In addition, though a low-density polyethylene has branched long chains and a high melt-viscoelasticity, a high-density polyethylene has no branched long chain and a low melt-viscoelasticity, and hence, uniform expansion of bubbles is difficult to realize when releasing the resin, having incorporated therein a foaming agent, from a high temperature-high pressure zone to a low temperature-low pressure zone to expand the same, and there tends to take place a reduction of physical properties due to the breaking of bubbles and the appearance tends to become bad. For example, in the case of extrusion foaming according to which foaming is performed by extruding the material through die into a low temperature-low pressure zone, the formation of bubbles in the die cannot be inhibited, and the bubbles formed in the die are broken by the actions of heat and shear stress in the course of extrusion foaming, resulting in a reduction of the quality of foam. Such a tendency is more prominent when the section area of die aperture is greater or when the thickness of foam is greater. In order to solve this problem, it may be considered to increase the amount of extrusion extremely or to instantaneously release the molten resin containing a foaming agent from a tightly closed vessel. However, because of the very high foaming velocity, an extremely large extrusion amount is necessary to completely eliminate the adverse effect of the formation of bubbles in the die, and an apparatus having a very special design and an extremely large extrusion capacity must be used. Further, if the extrusion amount is increased to an extreme extent, disturbance in flow such as melt fracture takes place, which causes a bad appearance such as irregularities on the surface of the foam or variation in thickness of the foam. On the other hand, the process of instantaneously releasing the material from a closed vessel is still unsatisfactory in that a high releasing velocity corresponding to the foaming velocity is difficult to realize and a foam having a good appearance such as surface state, moldability and so on cannot be obtained by such a process.

Accordingly, in spite of various proposals made so far, only foams of low-density polyethylene and polypropylene and giant cell type foams have actually been put into practice. It is the actual state that foams of high-density polyethylene having a uniform and minute closed cell structure and having simultaneously an excellent appearance and mechanical properties has not been practically used at all.

In view of such a situation, the present inventors have conducted extensive research with the aim of developing a foam having an excellent appearance, excellent mechanical properties and high heat-resistance simultaneously. As a result, it has been found that the object of the present invention can be acieved by using a specific foaming decelerant.

SUMMARY OF THE INVENTION

According to this invention, there is provided a foam composed of closed cells having an average cell diameter of 0.05–3 mm, the foam having a foam density of 0.007–0.10 $g/cm^3$, a variation in cell wall thickness of ±30% or less and a variation factor of cell diameter of 70% or less. The foam is obtained by foaming a composition consisting essentially of 100 parts by weight of a substantially non-crosslinked polyethylene having a density of 0.935 $g/cm^3$ or more and a melting point of 117° C. or more, 0.05–10 parts by weight of a foaming decelerant having the capability of prolonging the foaming time by at least one second, as compared with the case of the absence of the foaming decelerant, as measured by a glass tube blowing test method, and 0.001–5 parts by weight of a nucleating agent.

BRIEF DESCRIPTION OF THE DRAWING

The invention will be further explained with reference to the accompanying drawings. In the drawings, FIG. 3a and FIG. 3b are polarization microscopic photographs of cell walls of the foam of the present invention and a known foam, respectively.

DETAILED DESCRIPTION

In this invention, a foaming decelerant is incorporated into the composition, owing to which the foaming velocity, which is very high in the absence of the agent, can be reduced and the cell formation in the early stage of foaming can be suppressed, whereby a foam having a few broken cell walls, excellent mechanical properties, high heat-resistance and a good appearance can be obtained.

Herein, the foaming decelerant is as defined by way of a glass tube blowing test method which is an index showing the behavior of a foaming composition with respect to the foaming phenomenon. The foaming composition is released from a high temperature-high pressure zone into a low temperature-low pressure zone.

In this glass tube blowing test method, it has been determined that a foam having simultaneously excellent properties and an excellent appearance can be obtained by adding a foaming decelerant having the capability of prolonging the foaming time as compared with those in the product produced without adding a foaming decelerant.

Figure 1:
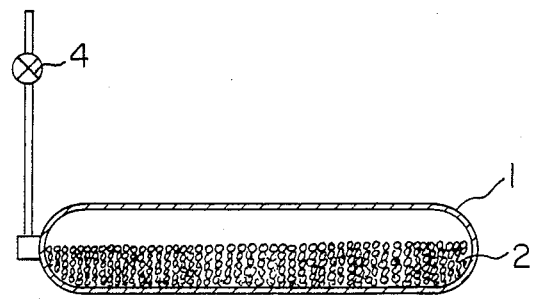
FIG. 1 illustrates the state wherein a resin mixture is placed in a glass tube by way of the glass tube blowing test method.
Figure 2:
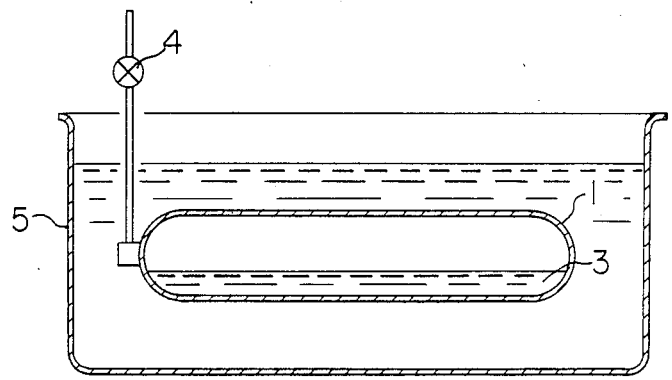
FIG. 2 illustrates the state wherein the glass tube of FIG. 1 is heated in an oil bath.

This glass tube blowing test method is carried out in the following manner: In a transparent, pressure-resistant, glass tube 1 having one closed end and an inner volume of 16 cc (inner diameter 12 mmφ, length 140 mm), as shown in FIG. 1, there was placed 4.0 g of a resin or a resin mixture 2 (a product prepared by kneading a predetermined quantity of additives with an ethylenic polymer and pulverizing or pelletizing the resulting mixture) used in a practical foam, and the pressure in the glass tube was reduced to about 10 mm Hg, after which a mixed foaming agent consisting of 1.03 g of dichlorotetrafluoroethane and 0.97 g of trichlorotrifluoroethane was poured into the glass tube and a ball valve 4 is then closed to seal the glass tube. Then, the glass tube 1 is dipped in a glass oil bath 5 kept at room temperature as shown in FIG. 2, after which it is heated to 140° C. By keeping it at 140° C. for about 1 hour, the resin or resin mixture is impregnated with the foaming agent, whereby a uniform and transparent molten mixture 3 is formed. When the molten mixture does not become transparent owing to other additives previously added, the additives are removed from the resin and the remaining resin is subjected to the test. Then, a change in the transparent molten mixture 3 is visually observed, while lowering the temperature of the oil bath at a rate of 0.75°±0.1° C./minute. After a while, a fog appears in the transparent molten mixture 3. When the oil temperature reaches a temperature 0.5° C. lower than the fogging temperature, the ball valve 4 is rapidly opened to lower the inner pressure of the glass tube 1 to atmospheric pressure, and simultaneously the state of the molten mixture 3 in the glass tube 1 is visually observed. In the course of the observation, minute bubbles appear in the molten mixture 3 in the glass tube, after which foaming starts and the bubbles fill the inner space of the glass tube. The content does not come out of the glass tube until the completion of the foaming.

The period of time from opening the valve to completion of foaming is measured and defined as the "foaming time". Experimental results on various combinations of resins and additives are listed in Table 1. The data shown in Table 1 is an average value of five measurements. Tables 2 to 4 illustrate the additives used in this experiment. In Table 1, Nos. 31 and 32 are cases where no additive is used, while Nos. 1 to 30 are cases where an additive is used. The use of the additive sometimes prolongs the foaming time and sometimes shortens it. Foaming decelerants having the capability of prolonging the foaming time by at least one second as compared with that in the case of the same resin free from the additive are suitable for use as the foaming decelerant of this invention.

The major part of the material constituting the cell wall of the foam of this invention is a substantially non-crosslinked polyethylene having a density of 0.935 g/cm³ or more and a melting point of 117° C. or more. The material is a mixture of the polyethylene and a minor proportion of a foaming decelerant, and optionally an additional minor proportion of nucleating agent.

It is necessary that said polyethylene be substantially non-crosslinked and its gel content be 10% or less, preferably 5% or less. The term "gel content" used herein means a value determined by extracting about 1 g of accurately weighed polyethylene with about 300 ml of dry xylene by boiling them for about 20 hours. After the extraction, the residual insoluble fraction is accurately weighed. The gel content is expressed by percentage of the insoluble fraction based on the initial weight of the sample. Crosslinkage is undesirable, because it makes cell wall fragile, decreases the characteristic flexibility of ethylenic polymer and simultaneously decreases other properties such as specific tensile strength and so on.

The polyethylene must have a density of 0.935 g/cm³ or more and a melting point of 117° C. or more. If the density is less than 0.935 g/cm³, the specific tensile strength is insufficient. If the melting point is less than 117° C., the heat shrinkage cannot be made sufficiently small.

The polyethylene used in this invention is a polymer composed mainly of ethylene and having a density of 0.935 g/cm³ or more and a melting point of 117° C. or more, and it preferably has a density of 0.945–0.970 g/cm³ and a melting point of 122° C. or more. It is not limited to a homopolymer of ethylene, and may also be a copolymer of ethylene and other monomers such as propylene, 1-butene, 1-hexene, 2-methylpentene and the like. It may also be a mixture of polyethylene and other resin or rubber, so far as the weight of other resin or rubber does not exceed 30% by weight. The polyethylene may also contain conventional additives. However, it is necessary for the polyethylene to contain the ethylene component in a proportion of 70% by weight or more, preferably 80% by weight or more, based on its total weight.

As the polyethylene used in this invention, those having a melt index of 0.02–40 g/10 minutes as measured at 190° C. under a load of 21.6 kg and a swelling value of 20–50 g/20 cm are particularly preferable. If the melt index is less than 0.02 g/10 minutes, the molded state (smoothness of surface and form stability) is inferior. If it is more than 40 g/10 minutes, the physical properties are not satisfactory. If the swelling value is less than 20 g/20 cm, the state of foaming is not satisfactory. If it is more than 50 g/20 cm, the molded state (surface smoothness and form stability) is not satisfactory. More preferably, the melt index should be 0.5–35 g/10 minutes as measured under a load of 21.6 kg and the swelling value should be 30–50 g/20 cm.

The foaming decelrant, i.e. another component constituting the cell wall, is mixed with the polyethylene for the reason mentioned above. Preferably, it is a substance having the capability of prolonging the foaming time by at least one second, more preferably at least two seconds, as compared with the case of the absence of the foaming decelerant as measured by a glass tube blowing test method, having a melting point lower than that of the polyethylene and being uniformly miscible with the molten polyethylene.

As a preferred foaming decelerant, there may be used compounds represented by the following general formula:

$$(H)_x\text{-}[N\text{-}(R_1\text{-}O)_{\overline{n}}A]_{3-x} \qquad (I)$$

where $R_1$ is an alkylene group having 1–5 carbon atoms, A is a hydrogen atom or an acyl group, n is an integer of 1–10 and x is 0 or an integer of 1–2, compounds represented by the following general formula:

$$HO\text{-}(R_2\text{-}O)_{\overline{m}}H \qquad (II)$$

wherein $R_2$'s may be identical with or different from one another, and represent $C_1$–$C_6$ divalent hydrocarbon groups and m is an integer of 1 or more, and compounds represented by the following general formula:

$$\begin{array}{c} R_6 \\ | \\ R_5\text{-}\overset{\oplus}{N}\text{-}CH\text{-}\overset{\phantom{|}}{C}\text{-}O^{\ominus} \\ | \quad | \quad \| \\ R_7 \quad R_8 \quad O \end{array} \qquad (III)$$

wherein $R_5$ is hydrogen or

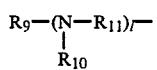

$$R_9\text{-}(\underset{\underset{R_{10}}{|}}{N}\text{-}R_{11})_l\text{-}$$

in which $R_9$ and $R_{10}$ are hydrogen atom or hydrocarbon groups having 1–23 carbon atoms, $R_{11}$ is a hydrocarbon group having 1–6 carbon atoms and l is 0 or an integer of 1–6; $R_6$ and $R_7$ are hydrogen atoms or hydrocarbon groups having 1–23 carbon atoms; and $R_8$ is a hydrogen atom or a hydrocarbon group having 1–6 carbon atoms.

Examples of the compound represented by the general formula (I) usable in this invention as the foaming decelerant include 2-hydroxyethylamine, di-2-hydroxyethylamine, tri-2-hydroxyethylamine, 2-hydroxypropylamine, di-2-hydroxypropylamine, tri-2-hydroxypropylamine, 3-hydroxypropylamine, di-3-hydroxypropylamine, tri-3-hydroxypropylamine, tri-polyoxyethyleneamine, and their fatty acid ester compounds such as tri-2-hydroxyethylamine monostearate, tri-2-hydroxyethylamine distearate, tri-2-hydroxyethylamine tristearate, tri-2-hydroxyethylamine monolaurate, tri-2-hydroxyethylamine dilaurate, tri-2-hydroxyethylamine trilaurate and the like. Among them, particularly preferable are 2-hydroxyethylamine, di-2-hydroxyethylamine, tri-2-hydroxyethylamine, 2-hydroxypropylamine, di-2-hydroxypropylamine, tri-2-hydroxypropylamine and the like. These amines may be used either alone or in combination of two or more.

Examples of the compound represented by the general formula (II) include ethylene glycol, propanediol, butanediol, pentanediol, hexanediol, polyethylene glycol, polypropylene glycol, polyoxytetramethylene glycol, polyoxyethylene-polyoxypropylene block polymer and the like. Among them, particularly preferable are block polymers represented by the following general formula:

$$HO-(R_3O)_a(R_4O)_b(R_3O)_c-H \qquad (IV)$$

wherein $R_3$ and $R_4$ may be the same or different from each other and represent hydrocarbon groups having 1-6 carbon atoms and a, b and c represent integers of 1 or more. Among them, more preferable are polyoxyethylene-polyoxypropylene block polymers represented by the general formula (IV) wherein $R_3$ is $-CH_2-CH_2-$ and $R_4$ is

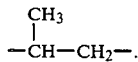

$$-\underset{\underset{CH_3}{|}}{CH}-CH_2-.$$

Examples of the compound represented by the general formula (III) include betaine, laurylbetaine, stearylbetaine, laurylglycine, stearylglycine, lauryldi(aminoethyl)glycine, stearyldi(aminoethyl)glycine, glycine, alanine, valine, leucine and the like. Among them, particular preferable compounds are laurylbetaine, stearylbetaine, lauryldi(aminoethyl)glycine, and stearyldi(aminoethyl)glycine.

These compounds may be used either alone or in combination of two or more. Their combinations with other additives are also employable.

These foaming decelerants are incorporated into the composition in a proportion of 0.05-10 parts by weight, preferably 0.1-8 parts by weight, per 100 100 parts by weight of polyethylene. If the amount is less than 0.05 part by weight, the effect of lowering the foaming velocity is insufficient and the resulting foam is inferior in appearance and mechanical properties. If the amount exceeds 10 parts by weight, the effect will not increase corresponding to the large amount and the strength of polyethylene cell wall becomes low.

Further, the present invention is characterized in another aspect by adding a nucleating agent to the foaming composition in an amount of 0.001-5 parts by weight, preferably 0.002-3 parts by weight, per 100 parts by weight of polyethylene, which enables the production of a foam composed of minute cells having a uniform cell diameter and a high closed cell percentage (i.e. high compression recovery) which has never been obtained by the prior art (for example, U.S. Pat. No. 3,787,543). As said nucleating agent, those conventionally used hitherto may be used. Examples of such nucleating agents include inorganic fine powders such as clay, talc, silica and the like, metallic salts of fatty acids such as zinc stearate, calcium stearate and the like, and so on. The nucleating agent may also be a substance decomposable at the time of foaming so as to become undetectable in the foam. It may also be a finely pulverized pigment or the like.

An amount of the nucleating agent exceeding 5 parts by weight is undesirable, because the appearance and physical properties of foam are inferior.

It is necessary that the foam of this invention be composed of an aggregate of closed cells having an cell diameter of 0.05-3 mm, preferably 0.1-2 mm, with the foaming being conducted so as to give a foam density of 0.007-0.10 g/cm$^3$, preferably 0.01-0.05 g/cm$^3$, a variation in thickness of cell wall falling within ±30%, preferably ±25% and a variation factor of cell diameter of 70% or less. If these values are out of the above-mentioned ranges, the foam is unsatisfactory in specific tensile strength, compression recovery, heat-shrinkage and appearance.

The term "aggregate of closed cells" referred to herein means that the open cell content as measured by the air pycnometer method prescribed in ASTM D-2856 is 20% or less. If the open cell content exceeds 20%, physical properties such as compression recovery and the like are low. The open cell content is preferably 10% or less.

The foam of this invention is composed of polyethylene containing the above-mentioned foaming decelerant, and has a uniform closed cell structure small in the variation in thickness of cell wall and variation factor of cell diameter, by which there can be achieved such excellent properties as a specific tensile strength of 150 kg/cm$^2$ or more, a compression recovery of 80% or more, a heat-shrinkage of 50% or less, a variation in thickness of foam of less than 50%, a corrugation value of less than 100% and a surface smoothness of less than 2 mm.

If the cell wall film in the foam of this invention is observed for birefringence under the crossed Nicols of polarization microscope, it looks like such an image that points having a diameter of 5μ or less are uniformly scattered in the dark background at the position of extinction, as shown in FIG. 3a. This is probably because the foam of this invention contains a foaming decelerant so that expansion is slowly and uniformly caused with formation of cells. To the contrary, commercially available polypropylene foam formed by rapid expansion gives an entirely black image as a whole, as shown in FIG. 3b.

The foam of this invention can be produced according to known processes. Preferably, however, it is produced by an extrusion foaming process.

According to the process of this invention, the desired foam can be obtained by heating and kneading:
(a) 100 parts by weight of a substantially non-non-cross-linked polyethylene having a density of 0.935 g/cm$^3$ or more and a melting point of 117° C. or more,
(b) 0.05-10 parts by weight of a foaming decelerant having an ability to prolong the foaming time by at least one second as compared with the absence of the foaming decelerant as measured by a glass tube blowing test method,
(c) 0.001-5 parts by weight of a nucleating agent, and
(d) 10-140 parts by weight of a volatile organic foaming agent under a high pressure at a temperature not lower than the melting point of the polyethylene, and then extruding the mixture from a high temperature-high pressure zone to a low temperature-low pressure zone to continuously expand the mixture.

This process can be practised preferably in the following manner: 100 parts by weight of the polyethylene, 0.05-10 parts by weight of the specified foaming decelerant and 0.001-5 parts by weight of the nucleating agent are previously mixed together thoroughly. The mixture is fed to an extruder and heated to a sufficiently high temperature not lower than the melting point of polyethylene to melt polyethylene. The mixture is thoroughly mixed and kneaded and a sufficient pressure is applied thereto. Into the molten mixture, 10-140 parts by weight of a volatile organic foaming agent is introduced through an introducing inlet provided at the tip of the extruder under a pressure sufficiently higher than the inner pressure of the extruder, after which the resulting mixture is thoroughly mixed and kneaded to have uniformly dispersed therein the volatile organic foaming agent. This mixture is cooled to a temperature slightly (at most 20° C.) higher than the melting point of polyethylene by means of a cooling device connected to the extruder, and then it is extruded through the die into a low temperature-low pressure zone. Although the composition containing the volatile organic foaming agent shows a tendency of foaming at this time, the formation of bubbles in die is suppressed by the action of the foaming decelerant, so that expansion starts when the composition has reached a position a little beyond the die. Thus, a foam having a good surface appearance and excellent mechanical properties can be formed.

Polyethylene used herein is a substantially non-crosslinked polyethylene having a density of 0.935 g/cm$^3$ or more and a melting point of 117° C. or more. The foaming decelerant is a compound capable of prolonging the foaming time by at least one second, preferably at least 2 seconds, as compared with the absence of the foaming decelerant as measured by a glass tube blowing test method. More preferably, it comprises at least one compound represented by the aforementioned general formulas (I) to (III).

The foaming agent used in this invention is a volatile organic foaming agent, by the use of which a foam having a high proportion of closed cells and a low foam density can be produced from a non-crosslinked polyethylene. If a decomposition type foaming agent is used mainly, the low-density foam cannot be obtained from a non-crosslinked polyethylene ("Plastic Foam Handbook", edited by Maki and Kosakada, published by Nikkan Kogyo Shinbun-sha, pp. 119-120).

As the volatile organic foaming agent, halogenated hydrocarbons are preferred, and mixtures of different halogenated hydrocarbons are more preferable. Preferred examples of the volatile organic foaming agent include mixed foaming agents consisting of dichlorotetrafluoroethane and other halogenated hydrocarbons. Among said other halogenated hydrocarbons, particularly preferred are at least one member selected from the group consisting of trichloromonofluoromethane, dichloromonofluoromethane, dichlorodifluoromethane, trichlorotrifluoroethane, methyl chloride and dichloromethane. In this mixed foaming agent, the molar ratio of dichlorotetrafluoroethane to other halogenated hydrocarbon is preferably in a range of 1:4 to 4:1, and particularly in a range of 3:7 to 7:3.

In this invention, the proportion of the volatile organic foaming agent is preferably in a range of 10-140 parts by weight, more preferably 20-100 parts by weight, per 100 parts by weight of polyethylene. If it is less than 10 parts by weight, a low-density foam is difficult to produce. An amount exceeding 140 parts by weight is undesirable, because such a large amount brings about no marked decrease in foam density so that it is not economical, and in addition, the use of such a large amount causes deterioration of the quality of the foam.

In this invention, conventional additives such as a lubricant (e.g. zinc stearate), ultraviolet absorber, antistatic agent, stabilizer, colorant, flame-retardant and the like may be incorporated into the composition in an amount conventionally employed in the ethylenic polymer composition fed to the extruder.

The foam of this invention is an aggregate of closed cells, has excellent heat-insulating property and cushioning property, and simultaneously has a uniform cell structure and a good appearance. It is very suitable for use, in the form of sheet, pipe, board and the like, as heat-insulating material for floor, wall, ceiling and the like of houses, as heat insulating material for keeping warm pipings, vessels and the like, as transport packaging material for electric instruments, precision machines, furniture, bottles and the like, and as cushioning material for automobiles, floors, walls and the like.

The characteristic feature of the process of this invention consists in that the excellent foam mentioned above can be produced continuously with a high productivity. The process of this invention is particularly suitable for producing foams of a large section area, which have been difficult to produce by the prior processes.

DESCRIPTION OF THE PREFERRED EMBODIMENTS

The invention will be explained in more detail below referring to the Examples. The values of properties mentioned in the Examples have been measured in the following manner:

(1) Density of Polyethylene

A polyethylene (in the case of commercially available products in the Comparative Examples, cell walls defining the cells cut out of foam were used) was kept at a temperature of 20°±2° C. and a relative humidity of 65±5% for 12 hours or more, after which it was thrown into a n-butanol-triethylene glycol type density gradient tube prepared according to JIS K 6760 at 23° C. to measure its density. Three test pieces were used per one test, and the results were expressed by an average value.

(2) Melting Point of Polyethylene

A polyethylene (in the case of commercially available products in the Comparative Examples, cell walls defining the cells cut out of foam were used) was examined with a differential scanning calorimeter (D.S.C.), and the peak temperature in the melting curve was taken as the melting point. Conditions for the measurement were as follows:

Weight of sample: 7 mg
Scanning speed: 16° C./minute
Thermal hysteresis:

$$150° \text{ C.} \times 3 \text{ min.} \xrightarrow[(16° \text{ C./min.})]{\text{Cooling}} 50° \text{ C.} \times 5 \text{ min.}$$
(Keeping)

$$\xrightarrow[(16° \text{ C./min.})]{\text{Heating}} \text{Measurement}$$

(3) Swelling Value of Polyethylene

A polyethylene (in the case of commercially available products used in the Comparative Examples, a foam was compressed with pressing plates at 150° C., finely pulverized and then used) was fed to an extruder having a diameter of 50 mm$\phi$ (cylinder length/cylinder diameter=30). To the tip of the extruder, a circular die having an inner diameter of 10 mm$\phi$ and an outer diamter of 16 mm$\phi$ had previously been attached downward, through which a tube-formed molded product was extruded at a screw revolution speed of 46 r.p.m. at a temperature of 180° C. The tube was immediately cut out at a position 20 cm lower than the die surface. The tube just after being extruded, having a length of 20 cm, was weighed, and the weight was taken as swelling value (unit: g/20 cm).

(4) Melting Index of Polyethylene

Melt index of polyethylene (in the case of commercially available products used in the Comparative Examples, cell walls defining the cells were cut out of foam and used) was measured according to ASTM D-1238.

The temperature of the measurement was 190° C., and the load for the measurement was 2,160 g or 21,600 g.

(5) Average Cell Diameter of Foam and Variation Factor of Cell Diameter

The measurements were carried out in the following manner, by the use of magnifying lens if necessary. Thus, three cubes of 10 mm in each side length were arbitrarily cut out of a foam sample. When the thickness of sample was smaller than 10 mm, a rectangular parallelpiped was used in place of the cube. On one of the faces of the cube cut out, the maximum length of each cell in any one direction was measured. The measurement was carried out on at least ten cells per one direction. Subsequently, a similar measurement was repeated in a direction perpenduclar to the above-mentioned direction. The measurements were carried out on three faces of the cube. Arithmetic mean for the measurements on three cubes was taken as average cell diameter.

From the cell diameter measured in the above-mentioned manner, standard deviation was calculated. Subsequently, a variation factor of cell diameter was calculated according to the following equation and taken as a measure for evaluating the variation in cell diameter:

$$\text{(Variation factor of cell diameter)} = \frac{\text{(Standard deviation of cell diameter)}}{\text{(Average cell diameter)}} \times 100 \ (\%)$$

If the variation factor of cell diameter exceeds 70%, unevenness of cell diameter becomes conspicuous and commercial value drops. It is preferably 50% or less.

(6) Variation in Thickness of Cell Wall

Thickness of cell wall was measured in the following manner either by observing the section directly with a microscope or observing a microscopic photograph of the section.

First, a cube of 10 mm or more in each side length was cut out of a foam sample by means of a razor blade. When the thickness of the sample was less than 10 mm, a rectangular parallelepiped was used in place of the cube. In parallel to one face of the cube cut out, a piece of 0.5–1 mm in thickness was cut out by means of a razor blade. Optionally, the cube was previously cut into chips having such a size as to facilitate the subsequent cutting work. The piece cut out was examined with a microscope to measure the thickness of cell wall film. When the cell wall thickness was small, gold was vapor-deposited on the surface of the sample and then it was examined by means of a scanning electron microscope. The measurement was carried out on five points equally dividing the distance between intersecting points of cell wall films into six, per one cell wall film, to determine average cell wall thickness ($\bar{x}$), maximum cell wall thickness ($x_1$), and minimum cell wall thickness ($x_2$). The magnification employed at the time of measurement was such that at least two significant figures could be read out. (For example, a magnification of 300 or more in the case of a cell wall film thickness of 10–20$\mu$.)

The measurement was carried out on any three or more cell walls belonging to different cells in one direction, and a similar measurement was repeated in three directions perpendicular to one another.

For each cell wall, $(x_1 - \bar{x})/\bar{x} \times 100$ (%) and $(x_2 - \bar{x})/\bar{x} \times 100$ (%) were calculated, from which variation in cell wall thickness was evaluated. When all the variations in cell wall thickness measured fall within ±30%, the cell wall thickness was regarded as uniform. Preferably, they fall within ±25%.

(7) Birefringence Test of Cell Wall Film in Foam

In the same manner as in the measurement of thickness of cell wall film, one cell wall film was cut out from a foam sample by means of a razor blade. In the case of samples having a large cell diameter, a chip having a thickness of 0.5 mm or less was cut out, and the part of the chip where one cell wall film was nearly parallel to the section may be observed. In the case of samples having a small cell diameter, the samples may be dipped in an aqueous solution of a surfactant, freezed and then cut.

The birefringence test was carried out by observing the cut out chip involving cell wall film or the cut out cell wall film under crossed Nicols by means of a polarization microscope. Thus, while revoluting the sample under crossed Nicols, the image was examined when the position of extinction was reached.

The images observed could be roughly classified into the following four types: (a) the case where the whole cell wall film is seen dark black as shown in FIG. 3b, (b) the case where many circular or elliptical spots (portions different in color from background) having a dimension of 5$\mu$ or less are seen in the dark black background, as shown in FIG. 3a, (c) the case where spots having a dimension of more than 5$\mu$ are seen and (d) the case where a part of cell wall film is seen have a different color.

These observations with a polarization microscope were carried out preferably at a magnification of about 700. When the image is (c) or (d), the cells are unevenly expanded to cause a deterioration in physical properties. As compared therewith, when the image is FIG. 3a or FIG. 3b, the cells are considered to be uniformly expanded.

(8) Density and Specific Gravity of Foam

As the test piece, a foam having a volume of 50 cm$^3$ or more was prepared. First, it was weighed with an accuracy of ±1%. Then, it was submerged in a measuring cylinder filled with water till about one half of its capacity. From the rise in water level, the volume of the test piece was calculated at an accuracy of ±1%, from which the foam density D (g/cm³) of the test piece was calculated according to the following equation:

D=W/V wherein W was the weight of the test piece (g) and V was the volume of the test piece (cm³).

Before the test, the test piece had previously been kept at a temperature of 20°±2° C. and a relative humidity of 65±5% for 12 hours or more. Three test pieces were used in each test, and the mean value of the values obtained was determined.

Specific gravity of foam was determined by dividing the foam density D by the density of water at 4° C. (1 g/cm³). This value was used for determining the specific tensile strength of a foam.

(9) Specific Tensile Strength of Foam

The test piece was a rectangular parallelepiped having a length of 80 mm, a width of 10 mm and a thickness of 5 mm which had been kept at a temperature of 20° C. and a relative humidity of 65±5% for 12 hours or more. When the sample was anisotropic, the test pieces were taken for each of the longitudinal and transverse directions.

When the thickness of a foam sample was less than 5 mm, a test piece having the same thickness as that of the original sample was taken.

The tensile testing machine had a device for indicating the maximum load and the maximum load at the time of test fell in a range of 15–85% of its capacity. The tolerance of the relative movement rate of test piece grips was ±5%, and the tolerance of the load scale was ±2%. A test piece was properly attached to the grips so that neither distortion nor any other troubles appeared in the course of test. The distance between grips was 50 mm, and the test piece was stretched at a drawing rate of 500 mm/minute to measure the maximum load. Tensile strength was calculated according to the following equation:

Tensile strength (kg/cm²)=F/Wt wherein
F: maximum load at breakage (kg),
W: width of test piece (cm),
t: thickness of test piece (cm).

Then, the tensile strength thus determined was divided by the specific gravity of the foam sample to determine the specific tensile strength. The number of test pieces was 5 (when the sample was anisotropic, 5 each of the longitudinal, transverse and thickness directions, so far as such a number of test pieces could be taken), and the result was expressed by an average value of all these test pieces.

(10) Compression Recovery of Foam

Test piece was a rectangular parallelepiped having a length of 100 mm, a width of 40 mm and a thickness of 50 mm and had been kept at a temperature of 20°±2° C. and a relative humidity of 65±5% for 12 hours.

When the thickness of a foam sample was less than 50 mm, those samples were superposed to give a thickness of 50 mm. Such a compression testing machine that a constant speed compression was possible was used. At a compression rate of 10 mm/minute, the test piece was compressed to 50% of its initial thickness, immediately after which the load was removed and the test piece was allowed to stand for 30 seconds until the thickness was recovered. The test piece having the recovered thickness was again subjected to the second 50% compression test in the same manner as above. This procedure was repeated five times in total, after which the thickness after the fifth recovery was measured. The compression recovery was calculated according to the following equation:

Compression recovery (%)=$t_1/t_2 \times 100$ wherein
$t_1$: initial thickness (cm),
$t_2$: recovered thickness after five compressions (cm).

The number of test pieces was 3, and the result was expressed by an average value.

(11) Heat-Shrinkage of Foam

Test piece was a rectangular parallelepiped having a length of 40 mm, a width of 40 mm and a thickness of 5 mm and had been kept at a temperature of 20°±2° C. and a relative humdiity of 65±5% for 12 hours. When the thickness of the foam sample was less than 5 mm, test pieces having the same thickness as the sample was taken. A hot air circulation type oven, the temperature of which was controlled with an accuracy of 130°±2° C. was used. The test piece was horizontally placed in a hot air circulation type oven kept at 130° C. and heated there for 5 hours, after which it was taken out and allowed to stand in a testing room kept in the standard state for one hour. Then, the volume of the test piece was measured, which was taken as the volume after heating. The volume was measured by submerging the test piece in a measuring cylinder filled with water to about one half of its capacity and measuring the rise in water level. Heat-shrinkage at 130° C. was calculated according to the following equation:

$$\text{Heat shrinkage (\%)} = \frac{V_o - V_1}{V_o} \times 100$$

wherein
$V_o$: initial volume (cm³),
$V_1$: volume after heating (cm³).

The number of test pieces was 3, and the result was expressed by an average value.

(12) Appearance of Foam (i) Variation in Thickness of Foam

Variation in thickness was determined in the following manner: When the foam sample was in the form of a sheet or board, the sample was cut along a surface perpendicular to the direction of extrusion, and as to the cut section, there were measured the maximum thickness ($t_1$) and the minimum thcikness ($t_2$) in the part formed by removing the portion corresponding to 10% of width from the ends of the foam. The variation in thickness was calculated according to the following equation:

$$\text{Variation in thickness} = \frac{t_1 - t_2}{t_2} \times 100 \, (\%)$$

The measurement was carried out on five sections, and result was expressed by an average value of the five data.

In the case of a sample in the form of a column or cylinder, the foam sample was cut along a surface perpendicular to the direction of extrusion, and as to the cut section there were measure the maximum diameter (or thickness) ($t_1$) and the minimum diameter (or thickness) ($t_2$), from which variation in thickness was calculated according to the above-mentioned equation.

(ii) Corrugation Value of Foam

In the case of a foam in the form of a sheet or board, it was measured in the following manner: Foam was cut along a surface perpendicular to the direction of extrusion. When the sample had a width of 20 cm or more, measurement was carried out on the width of 20 cm. When the sample had a width of less than 20 cm, the measurement was carried out on the original size. The foam was placed on a plane without applying any force thereto, and the distance from the plane to the upper surface of the foam was measured at the section to determine the maximum distance ($l_1$) and the minimum distance ($l_2$). The parts corresponding to 10% of the width from the ends of the foam were excepted from the measurement. Corrugation value was calculated according to the following equation, and measurement was carried out at five sections, and result was expressed by an average value of the five data.

$$\text{Corrugation value} = \frac{l_1 - l_2}{l_2} \times 100 \, (\%)$$

When the foam was in the form of a column or a cylinder, the foam was cut along a surface perpendicular to the direction of extrusion, and the maximum distance ($l_1$) from the center of the circumcircle of the cut section to the outer surface of the foam and the minimum distance between them ($l_2$) were measured. Corrugation value was determined according to the above-mentioned equation in the same manner as above.

(iii) Surface Smoothness of Foam

Surface smoothness of a foam in the form of a sheet or board was evaluated in the following manner:

From the foam, the parts corresponding to 10% of width from its ends were removed, and a piece having a length of 30 cm and a width of 30 cm was cut out from the remainder. When the length or width of the original sample was less than 30 cm, a piece having a length and width as large as possible was prepared after excepting the terminal parts.

The foam cut out was placed on a plane without applying any force thereto. The distance from the plane to the under surface of the foam was measured at 4 sections, and this was repeated for the front and back surfaces to determine the maximum distance (L).

In the case of a foam in the form of a column or cylinder, the foam was cut along a surface perpendicular to the direction of extrusion to prepare a piece having a length of 30 cm. When the length of the original sample was less than 30 cm, a length as large as possible was given to the cut piece.

The cut piece of foam was placed on a plane without applying any force thereto and observed from the sides of the longitudinal direction to determine the above-mentioned maximum distance (L) from the plane to the under surface of the foam.

The measurement was carried out four times while rotating the piece by 90° at once. Surface smoothness was expressed by the maximum distance (L) among all the measurements.

The definitions of rankings for the evaluation of appearance of foam, used in the following Examples, are as follows:

(1) Variation in thickness of foam
  A: Variation in thickness is less than 30%,
  B: Variation in thickness is not less than 30% and less than 50%,
  C: Variation in thickness is 50% or more.

(2) Corrugation value of foam
  A: Corrugation value is less than 50%,
  B: Corrugation value is not less than 50% and less than 100%,
  C: Corrugatoin value is 100% or more.

(3) Surface smoothness of foam
  A: Surface smoothness is less than 1 mm,
  B: Surface smoothness is not less than 1 mm and less than 2 mm,
  C: Surface smoothness is 2 mm or more.

(4) Overall evaluation for appearance of foam

Overall evaluation of the appearance of form is according to the following criterion:
  A: Foam ranked A with respect to all of the variation in thickness, corrugation value and surface smoothness.

Foam having a good appearance and a high commercial value.

B: Foam involving an evaluation of rank B but not involving an evaluation of rank C in either of variation in thickness, corrugation value and surface smoothness.

Foam having a sufficient commercial value, in spite of its somewhat inferior appearance.

C: Foam involving an evaluation of rank C in either of variation in thickness, corrugation value and surface smoothness.

Foam inferior in commercial value, having conspicuous irregularites, wrinkle and the like on the surface.

This invention will be explained in detail with with reference to Examples. The resins and compounds used in the Examples and Comparative Examples are listed in Tables 2-5.

EXAMPLE 1

A base material for foaming was prepared by dry-blending 100 parts by weight of a polyethylene having a density of 0.960 g/cm$^3$, a melting point of 131° C., a melt index of 26 g/10 minutes under a load of 21,600 g and a swelling value of 36 g/20 cm (Resin I) as a resin, 0.5 part by weight of polyoxethylene-polyoxypropylene block polymer having an average molecular weight of 1,670 (Pronon 201, manufactured by Nippon Yushi K.K.) as a foaming decelerant and 0.1 part by weight of talc as a nucleating agent by means of a Henschel mixer and then kneading the mixture thoroughly and uniformly by means of an extruder.

The base material for foaming was fed to an extruder of 65 mm$\phi$ diameter heated to a maximum temperature of 220° C. at a rate of 40 kg/hour and heated and kneaded together with a foaming agent introduced under pressure from the foaming agent-introducing inlet provided at the tip of extruder. As the foaming agent, a mixture (1.5:1.3 by mole) of dichlorotetrafluoroethane and trichlorotrifluoroethane was used. The foaming agent was continuously fed by means of a high pressure pump in a proportion of 50 parts by by weight per 100 parts by weight of polyethylene. The hot mixture was cooled to 126° C. by a cooling device provided in succession to the extruder, after which it was continuously extruded into the atmosphere through a rectangular die, the opening part of which had a width of 35 mm and a thickness of 2.2 mm, for the sake of foaming, to obtain a plate-shaped foam having a thickness of 15 mm and a width of 125 mm.

Characteristics of the foam thus obtained were as shown in Table 6. In this foam, the variation in thickness of cell wall film was at most ±22%, demonstrating that it had a uniform distribution of closed cells. It had a good appearance, excellent mechanical properties and a high heat resistance simultaneously. A birefringence test of the cell wall film by means of a polarization microscope revealed that it belonged to the type of FIG. 3a where minute white points were dispersed in background.

Comparative Examples 1-7

Characteristics of a variety of commercially available foams are shown in Table 6.

The following foams were used in the respective Comparative Examples:
Comparative Example 1: Foam of non-crosslinked, low-density polyethylene
Comparative Example 2: Foam of non-crosslinked, high-density polyethylene
Comparative Example 3: Foam of non-crosslinked polypropylene
Comparative Example 4: Foam of mixed resin consisting of high-density polyethylene and ionomer
Comparative Example 5: Foam of crosslinked, low-density polyethylene
Comparative Example 6: Foam of crosslinked polypropylene
Comparative Example 7: Foam of flexible polyurethane As compared with the foam of Example 1, the foams of Comparative Examples 1-7 were all inferior in either of appearance, mechanical properties and heat-resistance.

EXAMPLE 2

A foam was produced by repeating the procedure of Example 1, except that the kinds and amounts of the resin and the foaming decelerant were as shown in Experiment Nos. 1-9 in Table 7.

Properties of the foam thus obtained were as shown in Experiment Nos. 1-9 in Table 7. The values of foaming time of the same compositions as in the extrusion foaming, except that the nucleating agent had been omitted, as measured by a glass tube blowing test are also listed there.

The proportion of open cells was 10% or less in Experiment Nos. 1-8 and 18% in Experiment No. 9, demonstrating that all the samples had a uniform closed cell structure. The variation thickness of cell wall film was ±30% or less in all these foams. Thus, all these foams had a good appearance, excellent mechanical properties and a high heat-resistance, simultaneously. Birefringence test of the cell wall films by means of a polarization microscope revealed that they all belonged to the type of FIG. 3a where minute white points were dispersed in the background.

Comparative Example 8

A foam was produced by repeating the procedure of Example 1, except that the resins shown in Experiment Nos. 10-13 in Table 7 were used, and no foaming decelerant was used or the additives shown in Experiment Nos. 12 and 13 were added in place of the foaming decelerant.

Properties of the foams were as shown in Experiment Nos. 10-13 in Table 7. In Table 7, the data of foaming time of compositions comprising the same resin and the additives as in the extrusion foaming, except that the nucleating agent had been omitted, as measured by a glass tube blowing test, are also shown. When no foaming decelerant was added and when additive showing no decelerant effect on foaming velocity as measured by a glass tube blowing test was added, all the foams had a cell structure inferior in closed cell property and uniformity of cell diameter, and were inferior in both appearance and mechanical properties.

EXAMPLE 3

A foam was produced by repeating the procedure of Example 1, except that 100 parts by weight of a polyethylene having a density of 0.955 g/cm$^3$, a melting point of 130° C., a melt index of 4.3 g/10 minutes as measured under a load of 21,600 g and a swelling value of 34 g/20 cm (Resin III) was used as the resin, 3.0 parts by weight of polypropylene glycol having an average molecular weight of 2,000 (Poly G 2020 P, manufactured by Asahi Glass K.K.) was used as a foaming decelerant, 0.05 part by weight of talc was used as a nucleating agent and 80 parts by weight of an equimolar mixture of dichlorotetrafluoroethane and dichloromethane was used as a foaming agent.

The foam thus obtained had a uniform closed cell structure. The variation in thickness of cell wall film was ±30% or less, the foam density was 0.0103 g/cm$^3$, the average cell diameter was 0.65 mm, the variation factor of cell diameter was 52%, the specific tensile strength was 183 kg/cm$^2$, the compression recovery was 87%, the heat shrinkage was 34%, and the appearance was good.

EXAMPLE 4

A foam was produced by repeating the procedure of Example 1, except that 100 parts by weight of a polyethylene having a density of 0.957 g/cm$^3$, a melting point of 129° C., a melt index of 29 g/10 minutes as measured under a load of 21,600 g and a swelling value of 48 g/20 cm (Resin V) was used as the resin, 0.5 part by weight of di-2-hydroxyethylamine (DEA) was used as the foaming decelerant, 0.05 part of silica was used as the nucleating agent and 25 parts by weight of a mixture (1:2 by mole) of dichlorotetrafluoroethane and trichloromonofluoromethane was used as the foaming agent.

The foam thus obtained had a uniform, closed cell structure. The variation in thickness of cell wall film was ±30% or less, the foam density was 0.0356 g/cm$^3$, the average cell diameter was 2.52 mm, the variation factor of cell diameter was 23%, the specific tensile strength was 155 kg/cm$^2$, the compression recovery was 83% and the heat shrinkage was 22%, these data demonstrating the excellency of this foam.

EXAMPLE 5

A foam was produced by repeating the procedure of Example 1, except that 100 parts by weight of a polyethylene having a density of 9.54 g/cm$^3$, a melting point of 130° C., a melt index of 9.5 g/10 minutes as measured under a load of 21,600 g and a swelling value of 33 g/10 minutes (Resin II) was used as the resin, 1.5 parts by weight of di-2-hydroxyethylamine and 1.5 parts by weight of polyoxyethylene-polyoxypropylene block polymer (Pronon 204, manufactured by Nippon Yushi K.K.) were used as the foaming decelerant, 0.5 part by weight of talc was used as the nucleating agent and 30 parts by weight of a mixture (2:1 by mole) of dichlorotetrafluoroethane and n'ethyl chloride was used as the foaming agent. The foam thus obtained had a closed cell structure. The variation in thickness of cell wall film was ±30% or less, the foam density was 0.0240 g/cm$^3$, the average cell diameter was 0.09 mm, the variation factor of cell diameter was 56%, the specific tensile strength was 185 kg/cm$^2$, the compression recovery was 85%, and the heat-shrinkage was 35%. Though it had a somewhat wrinkly appearance, it was assessed as rank B and had a commercial value.

EXAMPLE 6

A foam was produced by repeating the procedure of Example 1, except that 100 parts by weight of a polyethylene having a density of 0.939 g/cm$^3$, a melting point of 125° C. and a melt index of 24 g/10 minutes as measured under a load of 21,600 g (Resin IV) was used as the resin, 2.0 parts by weight of polyoxyethylene-polyoxypropylene block polymer having an average molecular weight of 10,000 (Pronon 208, manufactured by Nippon Yushi K.K.) was used as the foaming decelerant, 0.2 part by weight of magnesium stearate was used as the nucleating agent and 40 parts by weight of an equimolar mixture of dichlorotetrafluoroethane and dichloromonofluoromethane was used as foaming agent. The foam thus obtained had a uniform closed cell structure. Having a foam density of 0.0207 g/cm$^3$ and an average cell diameter of 0.85 mm, it was a foam excellent in both appearance and mechanical properties.

EXAMPLE 7

A foam was produced by repeating the procedure of Example 1, except that 100 parts by weight of the same resin as in Example 1 was used as the resin, 8.0 parts by weight of 2-hydroxypropylamine was used as the foaming decelerant, 0.5 part by weight of silica was used as the nucleating agent and 35 parts by weight of an equimolar mixture of dichlorotetrafluoroethane and dichlorodifluoromethane was used as the foaming agent. The foam thus obtained had a uniform, closed cell structure. Having a foam density of 0.0240 g/cm$^3$ and an average cell diameter of 1.5 mm, it was a foam excellent in both appearance and mechanical properties.

EXAMPLE 8

A foam was produced by repeating the procedure of Example 1, except that 100 parts by weight of the same resin as in Example 1 was used as the resin, 0.2 part by weight of polyoxyethylene-polyoxypropylene block polymer having an average molecular weight of 2,220 (Pronon 201, manufactured by Nippon Yushi K.K.) was used as the foaming decelerant, 0.005 part by weight of talc was used as the nucleating agent and 30 parts by weight of an equimolar mixture of dichlorotetrafluoroethane and dichloromethane was used as the foaming agent. The foam thus obtained had a uniform, closed cell structure. Having a foam density of 0.0241 g/cm$^3$ and an average cell diameter of 1.0 mm, it was a foam excellent in both appearance and mechanical properties.

Comparative Example 9

A foam was produced by repeating the procedure of Example 1, except that no nucleating agent was used. The foam thus obtained had a closed cell structure, a foam density of 0.021 g/cm$^3$ and an average cell diameter of 2.5 mm. However, the variation in thickness of cell wall film exceeded ±30% and the variation factor of cell diameter was 77%. These data demonstrate the low uniformity of cells in this foam, so that it was inferior in mechanical properties.

Comparative Example 10

A foam was produced by repeating the procedure of Example 1, except that 8 parts by weight of an equimolar mixture of dichlorotetrafluoroethane and trichlorotriflyoroethane was added as the foaming agent per 100 parts by weight of the resin. The foam thus obtained had a foam density as high as 0.118 g/cm$^3$ and a compression recovery as low as 55%, and it lacked flexibility.

Comparative Example 11

A foam was produced by repeating the procedure of Example 1, except that 150 parts by weight of an equimolar mixture of dichlorotetrafluoroethane and trichlorotrifluoroethane was added as the foaming agent per 100 parts by weight of the resin. The foam thus obtained had a foam density of 0.0065 g/cm$^3$, demonstrating its high foaming ratio. However, it was inferior in closed cell property and the surface of the foam was markedly wrinkled so that appearance was ranked C. The compression recovery was as low as 62%.

Comparative Example 12

A foam was produced by repeating the procedure of Example 1, except that, per 100 parts by weight of the resin, 1.0 part by weight of stearic acid (trade name NAA 110, manufactured by Nippon Yushi K.K.) which had an effect of prolonging the foaming time of less than 1 second as measured by a glass tube blowing test was added in place of the foaming decelerant, and 30 parts by weight of butane was added as the foaming agent. The foam thus obtained had a foam density of 0.064 g/cm$^3$ and its appearance was ranked B. However, its average cell diameter was as large as 4.1 mm, and the compression recovery was as low as 40%.

In a birefringence test of cell wall film, it showed an uneven image, demonstrating that the expansion at the time of foaming was not uniform.

Comparative Example 13

A foam was produced by repeating the procedure of Example 1, except that, per 100 parts by weight of the resin, 40 parts by weight of dichlorotetrafluoroethane was added as the foaming agent and 6 parts by weight of talc was added as the nucleating agent. Though the foam thus obtained had a foam density of 0.0282 g/cm$^3$, its average cell diameter was as small as 0.02 mm and it was inferior in closed cell property. As for appearance, variation in thickness and corrugation value were both more than 100%, and this foam was entirely lacking in form-stability.

Comparative Example 14

A foam was produced by repeating the procedure of Example 1, except that, per 100 parts by weight of the same resin as in Example 1, 15 parts by weight of di-2-hydroxyethylamine was added as the foaming decelerant, 0.05 part by weight of talc was added as the nucleating agent, and 60 parts by weight of a mixed foaming agent consisting of a mixture (7:3 by mole) of dichlorotetrafluoroethane and trichlorotrifluoroethane was used. Though the foam thus obtained had a foam density of 0.0158 g/cm$^3$, its average cell diameter was 2.3 mm and the variation factor of cell diameter was 71%, these data demonstrating low uniformity in cell structure. Further, it was inferior in closed cell property and low in compression recovery.

Comparative Example 15

Using an apparatus prepared by attaching a steel-made bursting plate which bursts at about 35 kg/cm$^2$ and an orifice having an inner diameter of 1.5 mm to the tip of a steel pipe having an inner diameter of 20 mm and a length of about 150 mm, a foam was produced in the following manner: 20 g of a polyethylene having a density of 0.955 g/cm$^3$ and a melt index of 3.6 g/10 minutes as measured under a load of 21,600 g and 7.5 g of dichlorotetrafluoroethane were placed in the steel pipe and tightly closed, and then it was heated at 175° C. for 16 hours. Thereafter, a nitrogen gas having a pressure of 40 kg/cm$^2$ was sent to the steel pipe to break the bursting plate and extrude the contents. The foam thus obtained was a cylinder having a diameter of about 5 mm. It was inferior in uniformity of cell structure and closed cell property and low in compression recovery.

Comparative Example 16

Using the same apparatus (extruder, cooling device and die) as in Example 1, a foam was produced in the following manner: 42 parts of dichlorotetrafluoroethane and 25 parts of normal propanol were added to 100 parts of a polyethylene having a density of 0.958 g/cm$^3$ and a melt index of 0.4 g/10 minutes as measured under a load of 2,160 g, and the resin temperature at the outlet of the die was adjusted to 132° C. By the same procedure as in Example 1, a foam was obtained. Though the foam thus obtained had a foam density of 0.0335 g/cm$^3$, it had a maredly waved and wrinkled appearance with voids and lacked uniformity of cell structure. Further, it was also inferior in compression recovery.

Comparative Example 17

Using the same apparatus (extruder, cooling device and die) as in Example 1, a foam was produced in the following manner: A foam was produced from 100 parts of a polyethylene having a density of 0.960 g/cm$^3$ and a melt index of 0.3 g/10 minutes as measured under a load of 2,160 g, 1 part of calcium carbonate as the nucleating agent and 15 parts of trichlorofluoromethane as the foaming agent. The foam obtained had a foam density of 0.065 g/cm$^3$ and an average cell diameter of 6.5 mm. However, it was rigid and inferior in compression recovery.

Comparative Example 18

Using the same apparatus (extruder and cooling device) as in Example 1 with a circular die, a foam was produced in the following manner: 100 parts of a polyethylene having a density of 0.953 g/cm$^3$ and a melt index of 0.9 g/10 minutes under a load of 2,160 g, 168 parts of trichlorofluoromethane and 19 parts of dichloroteterafluoroethane were melted and thoroughly mixed together uniformly, and then the mixture was extruded to obtain a foam. The foam thus obtained was a sheet having a foam density of 0.022 g/cm$^3$, an average cell diameter of 0.9 mm and a thickness of about 1-2 mm. However, it lacked uniformity of cell structure and had a bad appearance with a great variation in thickness.

TABLE 1

Results of glass tube blowing test

| Experiment No. | Resin | Additive Kind | Amount (parts by wt.) | Foaming time (seconds) |
|---|---|---|---|---|
| 1 | Resin II | DEA | 2 | 6.8 |
| 2 | " | HEA | 2 | 5.2 |
| 3 | " | HAP | 2 | 4.8 |
| 4 | Resin I | Pronon 104 | 5 | 6.1 |
| 5 | " | Pronon 104 | 1 | 5.6 |
| 6 | " | Pronon 201 | 1 | 5.8 |
| 7 | " | Pronon 204 | 1 | 5.8 |
| 8 | " | Pronon 208 | 1 | 5.0 |
| 9 | " | Poly G 2020P | 2 | 4.5 |
| 10 | " | Anon BF | 5 | 3.3 |
| 11 | " | NAA 180 | " | 2.9 |
| 12 | " | Stearic acid amide | " | 1.5 |
| 13 | " | Alflow P-10 | " | 2.0 |
| 14 | " | Unister M9676 | " | 2.2 |
| 15 | " | Nonion S-2 | 2 | 1.6 |
| 16 | " | Nonion ST60R | 2 | 1.8 |
| 17 | " | Nonion ST60R | 5 | 2.0 |
| 18 | " | Nonion ST221 | 2 | 1.5 |
| 19 | " | Nonion E208 | 5 | 2.6 |
| 20 | " | Nonion NS202 | " | 2.7 |
| 21 | " | Amine AB | " | 1.8 |
| 22 | " | Cation SA | " | 1.8 |
| 23 | " | Nymeen S20 | " | 2.3 |
| 24 | " | Nonsoul TN-1 | " | 1.9 |
| 25 | " | Persoft SF | " | 0.5 |
| 26 | " | Newlex Paste H | " | 1.5 |
| 27 | " | PE Wax 110P | " | 2.2 |
| 28 | " | PE Wax 200P | " | 2.0 |
| 29 | " | TLP | " | 2.1 |
| 30 | " | TSTP | " | 2.2 |
| 31 | " | None | 0 | 2.0 |
| 32 | Resin II | " | 0 | 2.6 |

Note:
Amount of additive is parts by weight per 100 parts by weight of resin.

TABLE 2

| Abbreviation | Name (main ingredient) | Maker |
|---|---|---|
| DEA | Di-2-hydroxyethylamine | Mitsui Toatsu K.K. |
| HEA | 2-Hydroxyethylamine | " |
| HPA | 2-Hydroxypropylamine | " |

TABLE 3

Structural formula $$HO{+}CH_2CH_2O{\overset{}{\rightarrow}}_{\overline{k}}CHCH_2O{\overset{}{\rightarrow}}_{\overline{m}}{+}CH_2CH_2O{\overset{}{\rightarrow}}_{\overline{n}}H$$
with CH$_3$ branch

| Trade name | Maker | Average molecular weight | m | l + n |
|---|---|---|---|---|
| Pronon 104 | Nippon Yushi K.K. | 1,670 | 17 | 14 |
| Pronon 201 | " | 2,220 | 34 | 5 |
| Pronon 204 | " | 3,330 | 34 | 30 |
| Pronon 208 | " | 10,000 | 34 | 180 |
| Poly G-2020P | Asahi Glass K.K. | 2,000 | 35 | 0 |

TABLE 4

| Name (Main component) | Structural formula | Trade name | Maker |
|---|---|---|---|
| Dimethylalkyl (palm oil) betaine | $\begin{array}{c}CH_2\\|\\R-N^{\oplus}-CH_2-\overset{O}{\underset{\|}{C}}-O^{\ominus}\\|\\CH_3\end{array}$ | Anon BF | Nippon Yushi K.K. |
| Stearic acid | $C_{17}H_{35}COOH$ | NAA 180 | " |
| Stearic amide | $C_{17}H_{35}CONH_2$ | Stearic acid amide (Reagent) | Tokyo Kasei K.K. |
| Erucic amide | $CH_3(CH_2)_7CH=CH(CH_2)_7CONH_2$ | Alflow P-10 | Nippon Yushi K.K. |
| Stearyl stearate | $C_{17}H_{35}COOC_{17}H_{35}$ | Unister M9676 | " |
| Polyoxyethylene monostearate | $C_{17}H_{35}COO(C_2H_4O)_nH$ | Nonion S-2 | " |
| Sorbitan monostearate | (structure with sorbitan ring bearing $CHCH_2OCC_{17}H_{35}$, OH groups) | Nonion ST60R | " |
| Polyoxyethylenesorbitan monostearate | (structure with $H(OC_2H_4)_nOHC$, $CHCH_2OCC_{17}H_{35}$, $CHO(C_2H_4O)_{\overline{n}}H$, $O(C_2H_4O)_nH$) | Nonion ST 221 | Nippon Yushi K.K. |
| Polyoxyethyleneoleyl ether | $C_{18}H_{35}O(C_2H_4O)_{\overline{n}}H$ | Nonion E 208 | " |
| Polyoxyethylenenonylphenol ether | $C_9H_{19}-\langle\text{phenyl}\rangle-O(C_2H_4O)_n$ | Nonion NS 202 | " |
| Octadecylamine | $C_{18}H_{37}NH_2$ | Amine AB | " |
| Octadecylamine acetate | $C_{18}H_{37}NH_2 \cdot CH_3COOH$ | Cation SA | " |
| Polyoxyethyleneoctadecylamine | $C_{18}H_{37}N\begin{array}{c}(C_2H_4O)_nH\\(C_2H_4O)_nH\end{array}$ | Nymeen S20 | " |
| Metallic salt of fatty acid | RCOOM | Nonsoul TN-1 | Nippon Yushi K.K. |
| Sodium alkylsulfate | $R-OSO_3Na$ | Persoft SF | " |
| Sodium dodecylbenzenesulfonate | $C_{12}H_{25}-\langle\text{phenyl}\rangle-SO_3Na$ | Newlex Paste H | " |
| Low-molecular weight polyethylene wax | $\text{-}(CH_2)_{\overline{n}}$ Density: 0.90 g/cm$^3$, molecular weight: 1,000 | PE Wax 110P | Mitsui Sekiyu Kagaku K.K. |
| Low-molecular weight polyethylene wax | $\text{-}(CH_2)_{\overline{n}}$ Density: 0.97 g/cm$^3$, molecular weight: 2,000 | PE Wax 200P | Mitsui Sekiyu Kagaku K.K. |
| Trilauryl phosphate | $(C_{12}H_{25}O)_3P=O$ | TLP | Daihachi Kagaku K.K. |
| Tristearyl phosphate | $(C_{18}H_{37}O)_3P=O$ | TSTP | Daihachi Kagaku K.K. |

TABLE 5

| | | Polyethylenes | | | | |
|---|---|---|---|---|---|---|
| Abbreviation | Density (g/cm$^3$) | Melting point (°C.) | Melt index under 21.6 kg load (g/10 min.) | Swelling value (g/20 cm) | Grade | Class |
| Resin I | 0.960 | 131 | 26 | 36 | Suntec-HD* | HDPE |

TABLE 5-continued

| Abbreviation | Density (g/cm³) | Melting point (°C.) | Polyethylenes Melt index under 21.6 kg load (g/10 min.) | Swelling value (g/20 cm) | Grade | Class |
|---|---|---|---|---|---|---|
| Resin II | 0.954 | 130 | 9.5 | 33 | B-870 Suntec-HD* F180 | HDPE |
| Resin III | 0.955 | 130 | 4.3 | 34 | Suntec-HD* B-880 | HDPE |
| Resin IV | 0.939 | 125 | 24 | 32 | Suntec* M-700E | MDPE |
| Resin V | 0.957 | 129 | 29 | 48 | Sholex** 6002B | HDPE |

Note:
*Trade mark of Asahi Kasei Kogyo Kabushiki Kaisha
**Trade mark of Showa Denko Kabushiki Kaisha
HDPE: high density polyethylene
MDPE: medium density polyethylene

TABLE 6

| No. | Appearance | Foam density (g/cm³) | Average cell diameter (mm) | Variation factor of cell diameter (%) | Specific tensile strength (kg/cm²) | Compression recovery (%) | Heat shrinkage (%) | Density (g/cm³) | Melting point (°C.) | Melt index under 21.6 kg load (g/10 min.) | Swelling value (g/20 cm) |
|---|---|---|---|---|---|---|---|---|---|---|---|
| Example 1 | A | 0.0210 | 0.83 | 42 | 222 | 91 | 30 | 0.960 | 131 | 26 | 36 |
| Comparative Example 1 | A | 0.0385 | 0.95 | 34 | 70 | 86 | 95 | 0.921 | 105 | 100 | 43 |
| Comparative Example 2 | A | 0.172 | 4.5 | 72 | 60 | 52 | 15 | 0.967 | 127 | 26 | 40 |
| Comparative Example 3 | C | 0.0101 | 0.95 | 73 | 145 | 85 | 20 | 0.910 | 160 | 200 | 28 |
| Comparative Example 4 | A | 0.0192 | 1.25 | 30 | 201 | 80 | 95 | 0.958 | 130 | 0.85 | 44 |
| Comparative Example 5 | A | 0.0278 | 0.45 | 47 | 86 | 93 | 74 | 0.961 | 101 | — | — |
| Comparative Example 6 | A | 0.0385 | 0.52 | 48 | 138 | 92 | 25 | 0.962 | 111 and 140 | — | — |
| Comparative Example 7 | A | 0.0333 | 0.93 | 46 | 48 | 97 | 10 | 1.10 | Unknown | — | — |

Note
Comparative Examples 5-7: Melt index and swelling valve were unmeasurable because the compositions showed no melt flow.

TABLE 7

| Example No. | Experiment No. | Resin | Additive Kind | Additive Amount (parts by wt.) | Nucleating agent Kind | Nucleating agent Amount (parts by wt.) | Appearance | Density of foam (g/cm³) |
|---|---|---|---|---|---|---|---|---|
| Example 2 | 1 | Resin II | DEA | 2 | talc | 0.1 | A | 0.0213 |
| | 2 | Resin I | Pronon 104 | 5 | " | " | A | 0.0192 |
| | 3 | " | Pronon 104 | 1 | " | " | A | 0.0214 |
| | 4 | " | Pronon 201 | " | " | " | A | 0.0220 |
| | 5 | " | Pronon 208 | " | " | " | A | 0.0221 |
| | 6 | " | Poly G-2620 | " | " | " | A | 0.0203 |
| | 7 | " | DEA/stearic acid amide | 0.5/0.5 | " | " | A | 0.0190 |
| | 8 | " | Pronon 104/ stearic acid amide | 0.5/0.5 | " | " | A | 0.0193 |
| | 9 | " | Anon BF | 1.0 | " | " | B | 0.0225 |
| Comparative | 10 | Resin II | None | 0 | " | " | C | 0.0225 |
| | 11 | Resin I | " | " | " | " | C | 0.0233 |
| | 12 | " | NAA 110 | 3 | " | " | B | 0.0218 |
| Example 8 | 13 | " | Nonion S-2 | " | " | " | C | 0.0225 |

| Example No. | Experiment No. | Average cell diameter (mm) | Variation factor of cell diameter (%) | Specific tensile strength (kg/cm²) | Compression recovery (%) | Heat shrinkage (%) | Foaming time by glass tube flowing test (sec) |
|---|---|---|---|---|---|---|---|
| Exam- | 1 | 1.05 | 32 | 215 | 91 | 31 | 6.8 |

TABLE 7-continued

| | | | | | | | |
|---|---|---|---|---|---|---|---|
| ple 2 | 2 | 1.45 | 35 | 195 | 90 | 29 | 6.1 |
| | 3 | 0.70 | 42 | 200 | 88 | 27 | 5.6 |
| | 4 | 0.87 | 41 | 210 | 89 | 28 | 5.8 |
| | 5 | 0.75 | 53 | 202 | 84 | 30 | 5.0 |
| | 6 | 0.73 | 58 | 193 | 85 | 28 | 4.5 |
| | 7 | 0.85 | 31 | 210 | 90 | 33 | 5.8 |
| | 8 | 0.77 | 34 | 205 | 92 | 29 | 5.2 |
| | 9 | 0.62 | 64 | 160 | 82 | 45 | 3.2 |
| Com- | 10 | 0.52 | 77 | 175 | 75 | 56 | 2.6 |
| para- | 11 | 0.91 | 71 | 140 | 60 | 55 | 2.0 |
| tive | 12 | 1.52 | 72 | 134 | 65 | 60 | 2.8 |
| Exam- | 13 | 0.80 | 79 | 145 | 70 | 58 | 2.0 |
| ple 8 | | | | | | | |

Note
[1] The data of foaming time herein shown are those for compositions comprising the same resin and additives as in the extrusion foaming, except that the nucleating agent is ommitted as measured by a glass tube foaming test.
[2] Amounts of additive and nucleating agent are parts by weight per 100 parts by weight of resin.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A foam composed of closed cells having a specific tensile strength of 150 kg/cm$^2$ or more, a compression recovery of 80% or more and a heat shrinkage of 50% or less, a variation in thickness of foam of less than 50%, a corrugation value of less than 100% and a surface smoothness of less than 2 mm, an average cell diameter of 0.05–3 mm, said foam having a foam density of 0.007–0.10 g/cm$^3$, a variation in thickness of cell wall film of ±30% or less and a variation of cell diameter of 70% or less, obtained by foaming a composition consisting essentially of 100 parts by weight of a substantially non-crosslinked crystalline polyethylene having a density of 0.935 g/cm$^3$ or more and a melting point of 117° C. or more, 0.05–10 parts by weight of a foaming decelerant having the capability of prolonging the foaming time by at least one second as compared with the absence of the foaming decelerant, as measured by a glass tube blowing test method, wherein said foaming decelerant is a compound represented by a formula selected from at least one of the general formula:

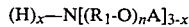    I.

wherein $R_1$ is an alkylene group having 1–5 carbon atoms, A is a hydrogen atom or an acyl group, n is an integer of 1–10, and x is 0 or an integer of 1–2;

$HO(R_2O)_mH$    II.

wherein $R_2$'s may be identical with or different from one another and represent divalent hydrocarbon groups having 1–6 carbon atoms and m is an integer of 1 or more; and

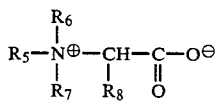    III.

wherein $R_5$ is hydrogen or a substituent represented by

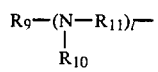

wherein $R_9$ and $R_{10}$ represent hydrogen or hydrocarbon groups having 1–23 carbon atoms; $R_{11}$ is a hydrocarbon group having 1–6 carbon atoms, and l is 0 or an integer of 1–6, $R_6$ and $R_7$ are hydrogen or hydrocarbon groups having 1–23 carbon atoms; and $R_8$ is hydrogen or a hydrocarbon group having 1–6 carbon atoms, and 0.001–5 parts by weight of a nucleating agent.

2. A foam according to claim 1, wherein said decelerant is selected from II and is represented by the formula:

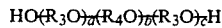

wherein $R_3$ and $R_4$ are different from each other and represent divalent hydrocarbon groups having 1–6 carbon atoms, and a, b and c are integers of 1 or more.

3. A foam according to claim 1, wherein said polyethylene has a melt index of 0.02–40 g/10 minutes as measured at 190° C. under a load of 21,600 g and a swelling value of 20–50 g/20 cm.

4. A foam according to claim 1, wherein said foaming decelerant is a compound represented by the following general formula:

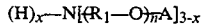

wherein $R_1$ is an alkylene group having 1–5 carbon atoms, A is a hydrogen atom or an acyl group, n is an integer of 1–10, and x is 0 or an integer of 1–2.

5. A foam according to claim 1, wherein said foaming decelerant is a compound represented by the following general formula:

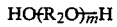

wherein $R_2$'s may be identical with or different from one another, and represent divalent hydrocarbon groups having 1–6 carbon atoms and m is an integer of 1 or more.

6. A foam according to claim 5, wherein said decelerant is represented by the formula:

wherein $R_3$ and $R_4$ are different from each other and represent divalent hydrocarbon groups having 1–6 carbon atoms, and a, b and c are integers of 1 or more.

7. A foam according to claim 6, wherein $R_3$ in the general formula is $-CH_2CH_2-$ and $R_4$ is $$-\underset{\underset{CH_3}{|}}{CH}-CH_2-.$$

8. A foam according to claim 1, wherein said foaming decelerant is a compound represented by the general formula:

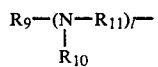

wherein $R_5$ is hydrogen or a substituent represented by $$R_9-(N-R_{11})_l-$$
$$\quad\;\;|$$
$$\quad\;\;R_{10}$$

wherein $R_9$ and $R_{10}$ represent hydrogen or hydrocarbon groups having 1-23 carbon atoms; $R_{11}$ is a hydrocarbon group having 1-6 carbon atoms, and $l$ is 0 or an integer of 1-6, $R_6$ and $R_7$ are hydrogen or hydrocarbon groups having 1-23 carbon atoms; and $R_8$ is hydrogen or a hydrocarbon group having 1-6 carbon atoms.

* * * * *